United States Patent
Kruchowy et al.

(12)

(10) Patent No.: US 6,303,024 B1
(45) Date of Patent: Oct. 16, 2001

(54) THREE BATCH FILL/SETTLE/DRAW ELECTRONIC CONTROLLER FOR USE WITH A REVERSE OSMOSIS UNIT

(75) Inventors: Roman Kruchowy, Somis; Mark C. Miller, Ventura; Mark A. Silbernagel, Ojai, all of CA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 09/618,792

(22) Filed: Jul. 18, 2000

(51) Int. Cl.[7] .................................................. B01D 17/12
(52) U.S. Cl. .......................... 210/102; 137/391; 137/392; 340/618; 210/104; 210/141; 210/259
(58) Field of Search ................................. 210/85, 86, 94, 210/102, 104, 141, 257.2, 259, 513; 137/391, 392; 73/290 R, 304 C; 340/618, 619

(56) References Cited

U.S. PATENT DOCUMENTS 4,662,390 * 5/1987 Hawkins .............................. 137/392
5,059,317 * 10/1991 Marius et al. ..................... 210/257.2
6,001,244 * 12/1999 Salter et al. ......................... 210/104
6,001,246 * 12/1999 Seukonis .
6,149,802 * 11/2000 Zavarise et al. ..................... 210/104

* cited by examiner

Primary Examiner—Joseph W. Drodge
(74) Attorney, Agent, or Firm—David Kalmbaugh

(57) ABSTRACT

An electronic controller for controlling the fill, settle and draw operations of three settling tanks which are used with a reverse osmosis unit. The three settling tanks provide a pair of liquid level input signals which indicate the water level within each of the three settling tanks. A bounce eliminator circuit eliminates oscillations from the input signals, providing at its outputs steady state liquid level signals which are active low. The liquid level signals are supplied to a programmable logic device which has a state machine. The state machine sequentially controls the fill, draw and settle operations of the three settling tanks. The programmable logic device provides logic signals which are active low and which activate fill and draw valves associated with each of the three tanks.

20 Claims, 7 Drawing Sheets

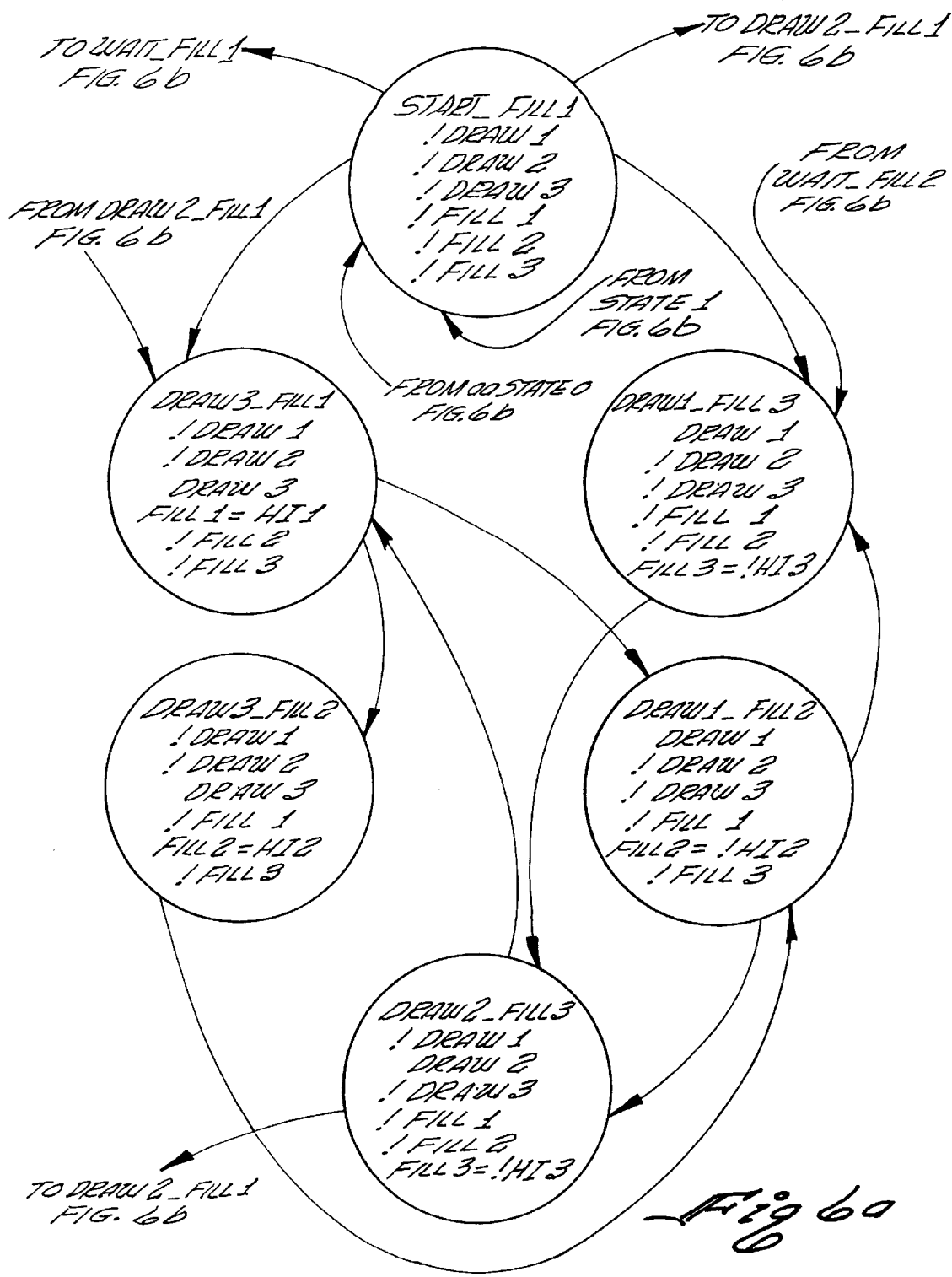

THREE BATCH FILL/SETTLE/DRAW ELECTRONIC CONTROLLER FOR USE WITH A REVERSE OSMOSIS UNIT

BACKGROUND OF THE INVENTION

1. Field of the Invention

The present invention relates generally to an electrical control circuit for use with a reverse osmosis unit. More particularly, the present invention relates to an electronic control circuit which sequentially controls the fill, settle and draw operations or cycles of a plurality of settling tanks used with a reverse osmosis unit.

2. Description of the Prior Art

The purification of water by reverse osmosis is a well established technology that is being increasingly used due to problems with the purity of water caused pollution, contaminants and other harmful products within the water. The increasing usage of reverse osmosis technology has resulted in the development and refinement of relatively efficient reverse osmosis systems producing tens of hundreds of thousands of purified water per day that are economically and technically feasible for use in domestic and similar applications.

For relatively large scale reverse osmosis systems, such as systems used by the military settling to purify water, settling tanks are generally provided for the removal of solid contaminants and environmentally harmful agents which will settle to the bottom of the tanks. The water from the settling tanks is then supplied to the reverse osmosis system for purification by the reverse osmosis system.

An electrical control circuit is required to open and close the valves and pumps associated with filling the settling tanks, drawing water from the settling tanks and allowing the contaminants in the water to settle at the bottom of the settling tanks. One possibility is to use programmable controllers as the control circuitry for the settling tank fill and drain operations. Programmable controllers are commercially available from several manufactures such as Allen-Bradley, a Division of Rockwell International Corporation.

While programmable controllers are generally acceptable as a means to control the fill, draw and settle operations of settling tanks, programmable controls are expensive and require the user to have extensive programming skills to program and trouble shoot these devices.

Accordingly, there is a need for an inexpensive and relatively simple in design control circuit which may be used to control the fill, draw and settle operations or cycles of settling tanks which are integral to a reverse osmosis system.

SUMMARY OF THE INVENTION

The present invention comprises a relatively simple in design and economical to produce electronic controller for controlling the fill, settle and draw operations or cycles of three settling tanks which are used with a reverse osmosis unit.

The three settling tanks provide a pair of liquid level input signals which indicate the water level within each of the three settling tanks. A bounce eliminator circuit eliminates oscillations from the input signals providing at its outputs steady state liquid level signals which are active low.

The liquid level signals are supplied to a programmable logic device which has a state machine. The state machine sequentially controls the fill, draw and settle operations of the three settling tanks. The state machine includes eight states during which a first of the three settling tanks is being filled with contaminated water, water is being drawn from a second of the three settling tanks and the third settling tanks is in a settling operation.

The programmable logic device provides logic signal which are active low and which activate the fill and draw valves associated with each of the three settling tanks.

Light emitting diodes are also provided which when energized indicate to the user which settling tank is being filled with contaminated water and which settling tank is settling and which tank is having water drawn from the tank.

The electronics controller also includes a plurality of optical isolators which isolate the fill and draw control signals provided by the programmable logic device from the signals which activate the fill, draw and pump valves associate with the three settling tanks.

BRIEF DESCRIPTION OF THE DRAWINGS

FIGS. 6a and 6b depict a state machine diagram for the programmable array logic device of the electronic controller of FIGS. 1–5.

DETAILED DESCRIPTION OF THE PREFERRED EMBODIMENT

Figure 1:
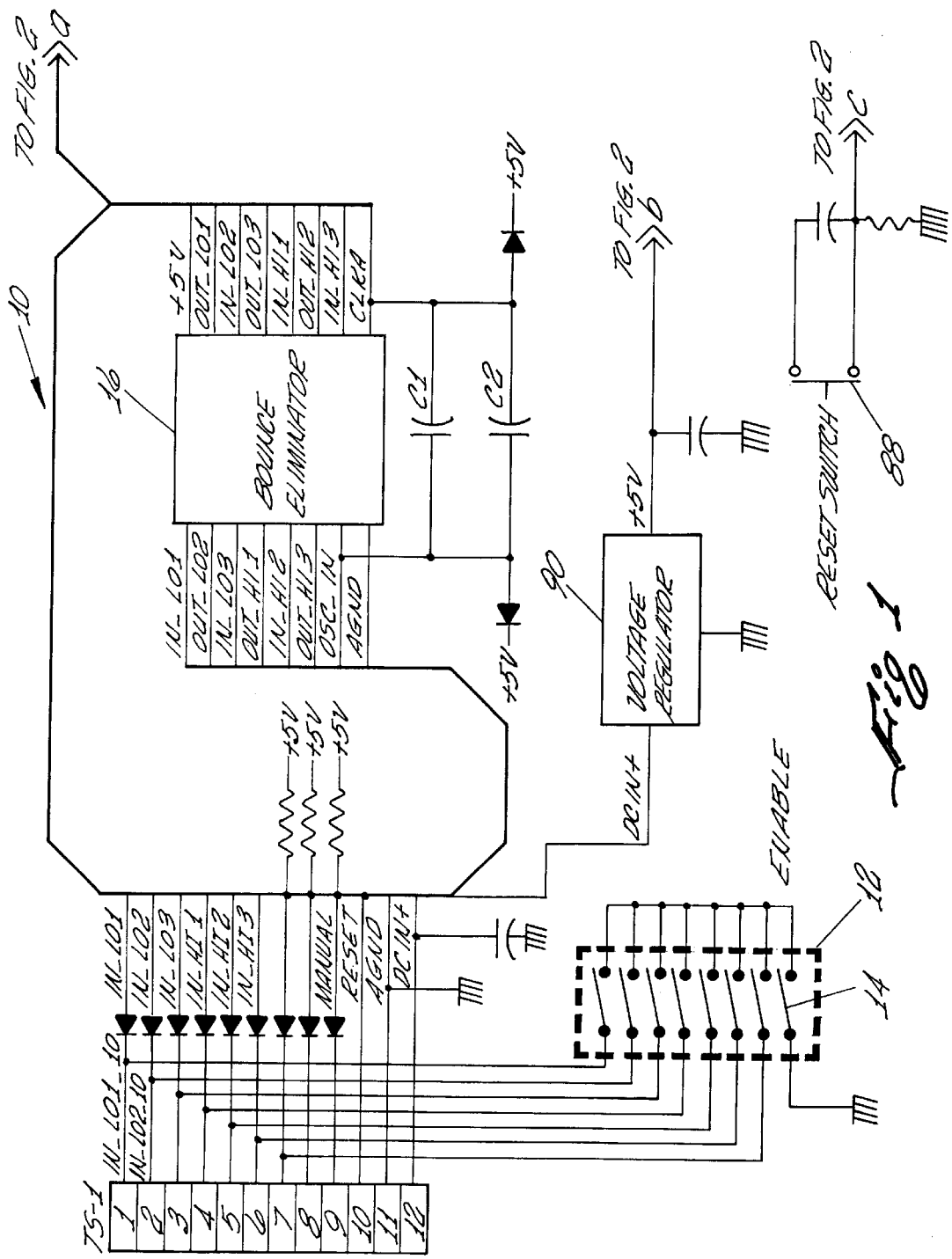
FIGS. 1–5 depict an electronic controller which is used to control the fill, draw and settle operations of settling tanks which are integral to a reverse osmosis system.
Figure 2:
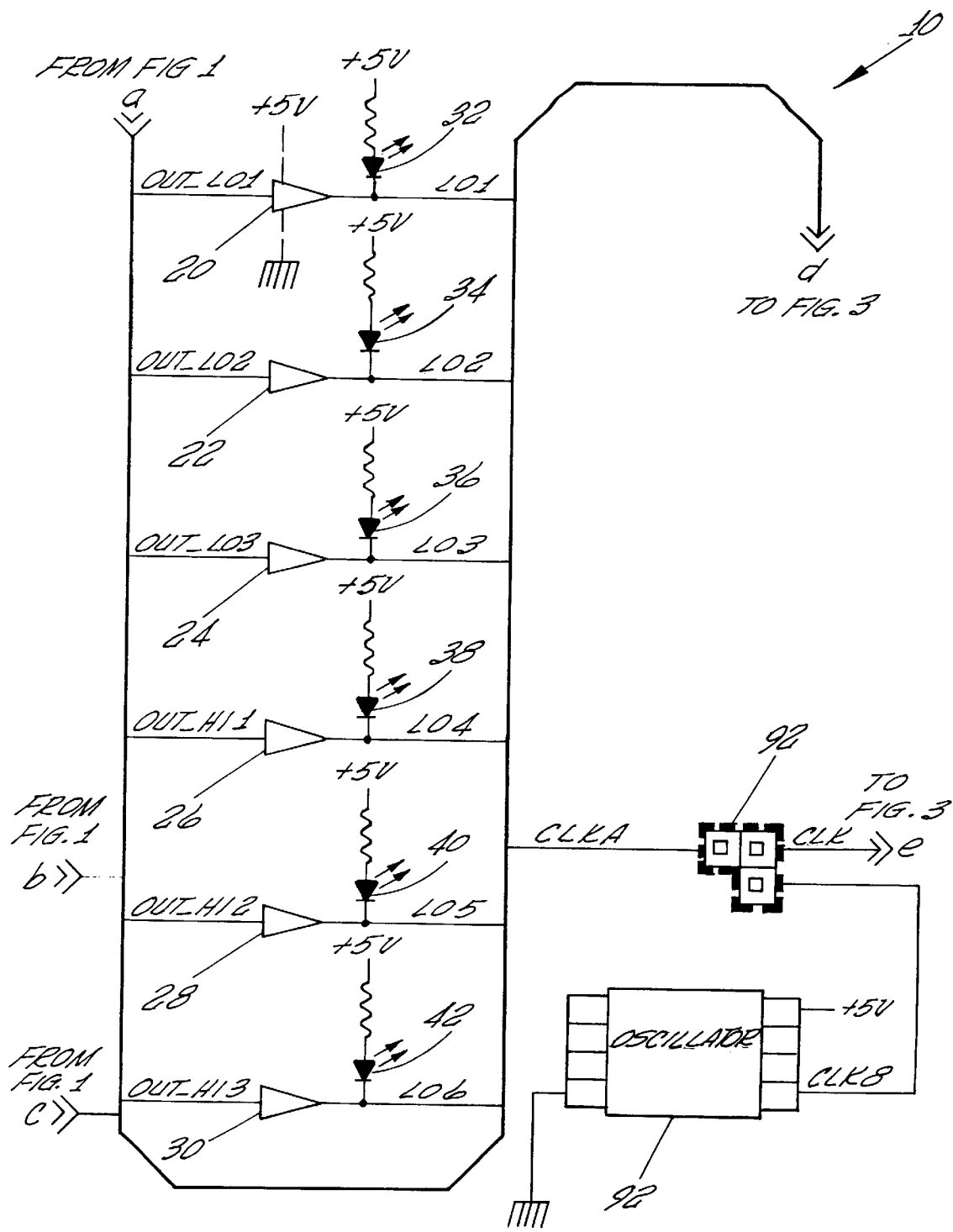
Figure 3:
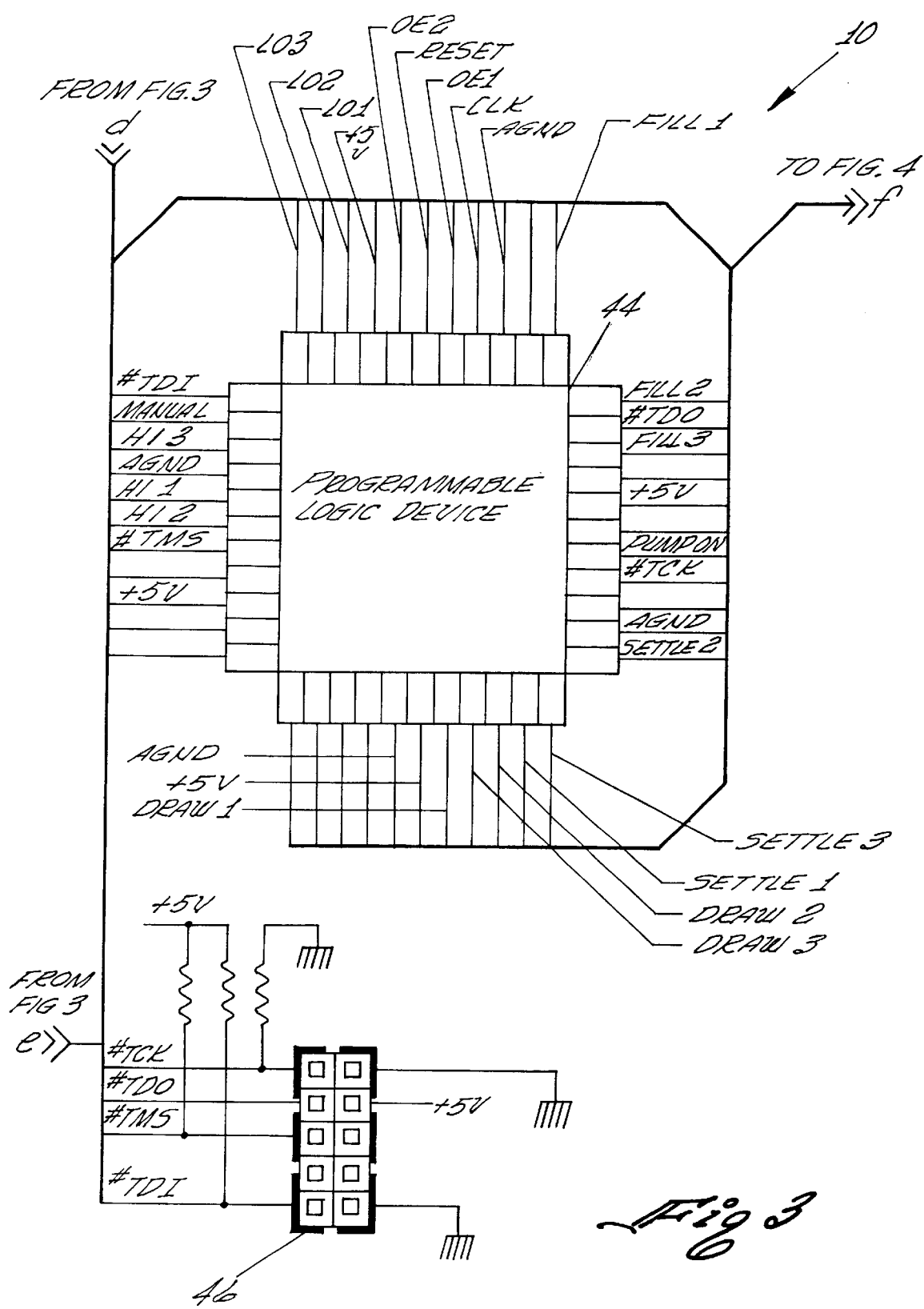

Referring to FIGS. 1–5, there is a shown an electronic controller, designated generally by the reference numeral 10, which is used with a reverse osmosis system to control the fill, drain and settle operations of cycles of three settling tanks prior to water in the settling tanks being supplied to the reverse osmosis system. Electronic controller 10 sequentially allows the tanks to be filled, provides for a time period which is sufficient for contaminants to settle at the bottom of the tanks and then allows for water to be withdrawn from the tanks with the water being supplied to the reverse osmosis unit.

Liquid level sensors located on the three settling tanks provide input signals which indicate the water level within each of the three tanks. The three low liquid level input signals supplied to input terminal TS-1 are IN_LO1_I0, IN_LO2_I0 and IN_LO3_I0. The three high liquid level input signals supplied to input terminal TS-1 are IN_HI1_I0, IN_HI2_I0 and IN_HI3_I0. Each of the signals supplied to input terminal TS-1 are active low signals.

Electronic controller 10 also includes a plurality of test switches 12 which may be used to simulate liquid levels within each of the three settling tanks for the purpose of testing controller 10. One test switch 14 of the plurality of test switches 12 is connected to ground such that closure of test switch 14 enables the remaining test switches.

The three low liquid/water level input signals and the three high liquid/water level input signals are supplied to a bounce eliminator circuit 16. Bounce eliminator circuit 16 is a time delay circuit which eliminates oscillations from the input signals providing at its outputs steady state signals OUT_LO1, OUT_LO2, OUT_LO3, OUT_HI1, OUT_HI2 and OUT_HI3. The time delay between the input signals to bounce eliminator circuit 16 and the output signals provided by bounce eliminator circuit 16 is determined by the capacitors C1 and C2. In the preferred embodiment, capacitor C1 is a 0.22 uF capacitor and capacitor C2 is a 0.1 uF capacitor. The time delay provided by circuit 16 and capacitors C1 and C2 is approximately 300 milliseconds At this time it should be noted that bounce eliminator circuit 16 is a MC14490 hex contact bounce eliminator commercially available from Motorola Inc. of Austin, Tex. It should also be noted that the output signals provided by bounce eliminator circuit 16 are zero to five volt logic level signals.

The signals OUT_LO1, OUT_LO2, OUT_LO3, OUT_HI1, OUT_HI2 and OUT_HI3 are supplied to a plurality of buffers 20, 22, 24, 26, 28 and 30. Buffers 20, 22, 24, 26, 28 and 30 buffer the signals OUT_LO1, OUT_LO2, OUT_LO3, OUT_HI1, OUT_HI2 and OUT_HI3 to drive light emitting diodes 32, 34, 36, 38, 40 and 42 and to provide voltage levels which are adequate for a programmable logic device 44.

When, for example, the OUT_LO1, OUT_LO2 and OUT_LO3 signals are active, the outputs of buffers 20, 22 and 24 will be at zero volts energizing light emitting diodes 32, 34 and 36 which indicates to the user that settling tanks one, two and three are empty. Similarly, when the OUT_HI1, OUT_HI2 and OUT_HI3 signals are active, the outputs of buffers 26, 28 and 30 will be at zero volts energizing light emitting diodes 38, 40 and 42 which indicates to the user that settling tanks one, two and three are full.

Figure 6B:
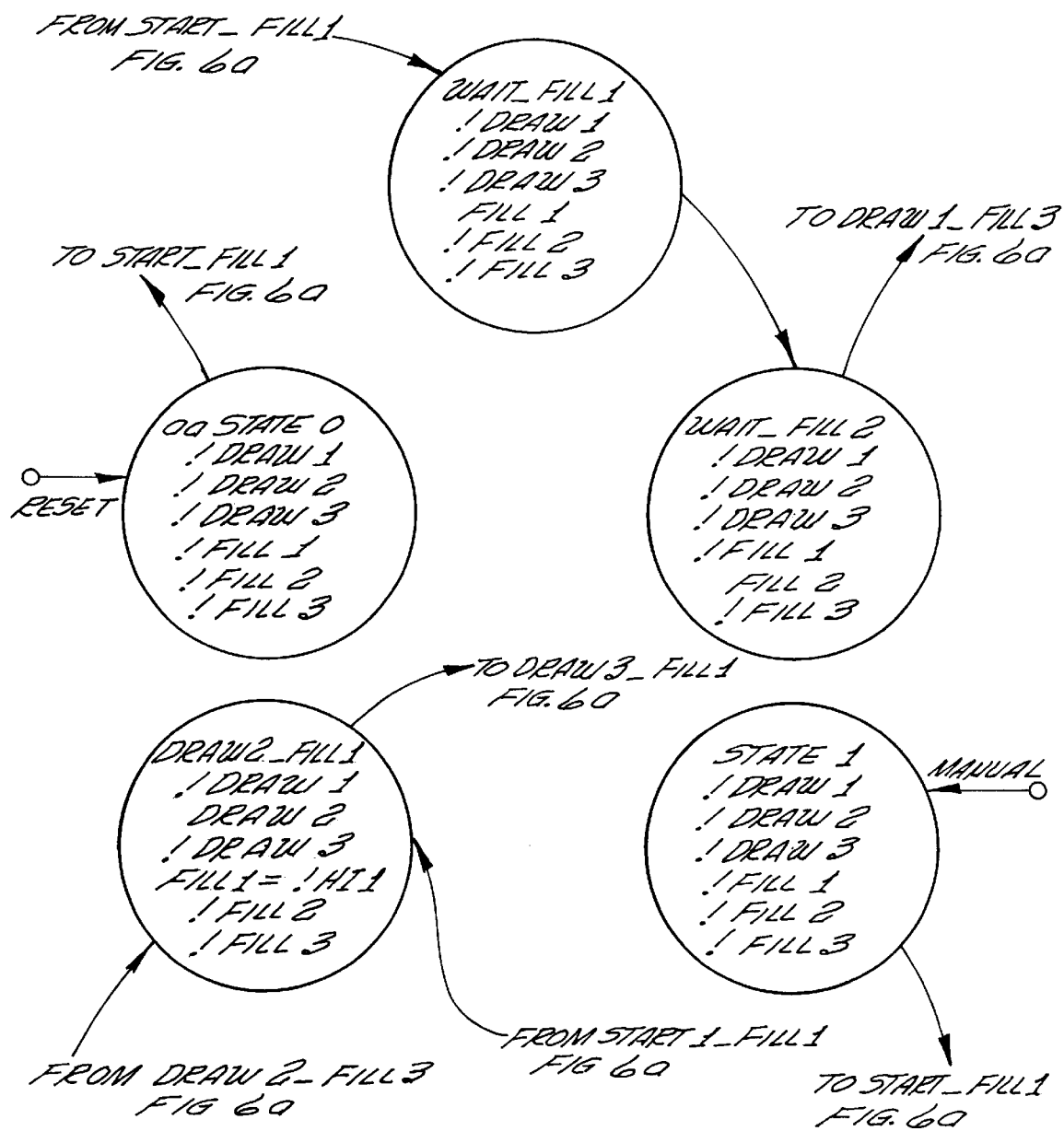

Programmable logic device 44 is programmed to execute the state machine functions illustrating in FIGS. 6a and 6b. The programmable logic device used in electronic controller 10 is a Model EPM7064SLC44 programmable logic device commercially available from Altera Corporation of San Jose, Calif.

A MANUAL signal when in the active low state allows the user to operate the valves associated with the three settling tanks manually since programmable logic device 44 is disabled when the MANUAL signal is low. The #TDI, #TDO, #TMS and #TCK signals are signals used to program device through an external JTAG 10-PIN MALE Header 46.

The PUMP_ON signal is a control signal provided by device 44 which controls the draw pump valve used when water is being pumped from a stream, river or the like to fill the three settling tanks.

The output signals provided by device 44 are supplied to a photocouplers or optical isolators 48, 50 and 52. Photocouplers 48, 50 and 52 receive logic level input signals and provide output signals which are used to activate the valves associated with the settling tanks. Each photocoupler 48, 50 and 52 uses four photodiodes to turn on an associated common emitter photo-transistors. The photocouplers 48, 50 and 52 isolate the logic level control signals provide by programmable logic device 44 from the signals which are use to activate the fill, draw and pump valves associated with the three settling tanks. This allows for voltages required to operate the fill, draw and pump valves associated with the three settling tanks.

A plurality of light emitting diodes 54, 56, 58, 60, 62, 64, 66, 68, 70, 72 and 74 are also provided to monitor the output signals from device 44.

When, for example, the FILL 1 signal is active low light emitting diode 54 is energized which indicates to the user that the FILL 1 signal is active. The photodiode 78 within photocoupler 48 associated with the FILL 1 signal is also energized which turns on the common emitter transistor 80 within photocoupler 48 associated with the FILL 1 signal. The FILL1_OUT signal is now active pulling the fill valve associated with the first tank to ground which activates the fill valve allowing the first settling tank to be filled with contaminated water. The FILL1_OUT signal is supplied to the fill valve through output terminal TS-2, terminal one.

The collector to emitter voltage for the common emitter transistors of photocouplers 48, 50 and 52 is approximately 40 VDC. Photocouplers 48, 50 and 52 may be a pair of Model No. PS2502-4 photocouplers commercially available from NEC Corporation of Tokyo, Japan.

Referring to FIGS. 1–5, 6a and 6b, when power is turned on, the state machine 82 of device 44 enters a state aaSTATE0 which is an asynchronous reset. In state aaSTATE0 the outputs of the state machine 82 of device 44 draw1, draw2, draw3, fill1, fill2 and fill3 are inactive. The valves associated with the settling tanks are also turned off.

A counter within the state machine 82 starts its count which allows the inputs to programmable logic device 44 to stabilize. The clock within logic device operates at about one tenth of a hertz and the count is set at 15 so that a count of 15 occurs in about 1.5 seconds.

State machine 82 proceeds to state $Start_{13}$ fill1 state. The valves to the settling tanks are turned off during Start_fill1 state. The inputs to the state machine 82 are also examined during Start_fill1 state. If HI1 and HI2 and HI3 input signals to device 44 are low (indicating that the three steeling tanks are full), or if HI1 and HI2 and HI3 input signals to device 44 are high (indicating that the three steeling tanks are not full) or the LO1 and LO2 and LO3 (indicating that the three settling tanks are empty) then state machine 82 proceeds to the state wait_fill1. When the three settling tanks are empty then the fill1 output, which is not high, transitions to an active state resulting in the FILL_OUT signal provided by photocoupler 48 being active low. This turns on the fill valve associated with the first settling tank allowing the settling tank to filled with contaminated water for purification.

When the settling tank one is full, as indicated by the signal IN_HI1 being active, the state machine 82 proceeds to state wait_fill2. One clock pulse is required for state machine 82 to transition from state to another state, that is one clock pulse is required for state machine 82 to transition from state wait_fill1 to state wait_fill2.

During state wait_fill2, fill2 is active resulting in a logic zero at the FILL2 output of programmable logic device 44. This, in turn, energizes photodiode 84, turning on common emitter transistor 86 of photocoupler 48 which activates the fill valve for settling tank two allowing settling tank two to be filled with contaminated water for purification.

When settling tank two is filled with contaminated water, the HI2 input signal to programmable logic device 44 will become active resulting in state machine 82 transitioning to state draw1_fill3. During state draw_fill3, settling tank three is filled with contaminated water for purification, and water is drawn from settling tank one for transfer to the reverse osmosis system.

At this time it should noted that the "!" in each state of state machine 82 is defined as "not". Thus, in state draw1_fill3, draw1 and fill3 are active resulting in the FILL3_OUT signal and the DRAW1_OUT signal provided by photocoupler 48 being active low.

When the first settling tank is empty the LO1 signal to device 44 will transition to an active low state which results in state machine 82 proceeding to state draw2_fill3. When state machine 82 is in state draw2_fill3 the fill3 remains active until the third settling tank is filled with contaminated water since fill3=!HI3. The HI3 input to programmable logic device 44 transitioning to an active low state indicates that settling tank three has been filled with contaminated water.

When HI3 is active (indicating that settling tank three is full) and !LO2 is inactive (indicating that water is still being drawn from settling tank two), state machine 82 proceeds to state draw2_fill1. During state draw2_fill1, water is being drawn from settling tank two and settling tank one is being filled with contaminated water.

When LO2 is active (indicating that settling tank two is empty) state machine 82 proceeds directly from state draw2_fill3 to state draw3_fill 1. Similarly, when state machine 82 is in draw2_fill1, water will continue to be drawn from settling tank two until tank two is empty at which time LO2 transition to an active low state. The state machine 82 then proceeds to state draw3_fill1.

During the draw3_fill1 state, water is being drawn from settling tank three and settling tank one is being filled. When HI1 transitions to an active state (indicating that settling tank one is full) and !LO3 is inactive (indicating that water is still being drawn from settling tank three), state machine 82 proceeds to the draw3_fill2 state.

During the draw3_fill2 state, water is being drawn from settling tank three and settling tank two is being filled with contaminated water. When LO3 transitions to an active low state (indicating that settling tank three is empty), state machine proceeds from the draw3_fill2 state to the draw1_fill2 state.

It should be noted that state machine 82 will also transition to the draw1_fill2 state from the draw3_fill1 state when LO3 is active which indicates that settling tank three is empty.

During the draw1_fill2 state, water is being drawn from settling tank one and settling tank two is being filled with contaminated water. When HI2 transitions to an active low state and LO1 is still not active, state machine 82 will transition from the draw1_fill2 state to the draw1$_{13}$ fill3 state.

In addition, during the draw1_fill2 state when LO1 transitions to an active low state, state machine will proceed to the draw2_fill3 state from the draw1_fill2 state.

Since LO1 is still inactive when state machine 82 transitions to the draw1_fill3 state, water will continue to be withdrawn from settling tank one until LO1 transitions to an active low state. During the draw1_fill3 state, settling tank three is also being filed with contaminated water.

When LO1 transitions to an active low (indicating that settling tank one is empty), state machine 82 transitions from state draw1_fill3 to state draw2_fill3. When settling tank three is filled with contaminated water, HI3 transitions to an active state. If settling tank two is not empty than state machine 82 proceeds to the draw2_fill3 state. During the draw2_fill3 state, water continues to be drawn from settling tank two, while settling tank one is filled with contaminated water.

State machine 82 also includes a manual mode of operation which is initiated by depressing the reset switch 88. The state machine 82 proceeds to STATE 1 and then to Start_fill1.

Figure 4:
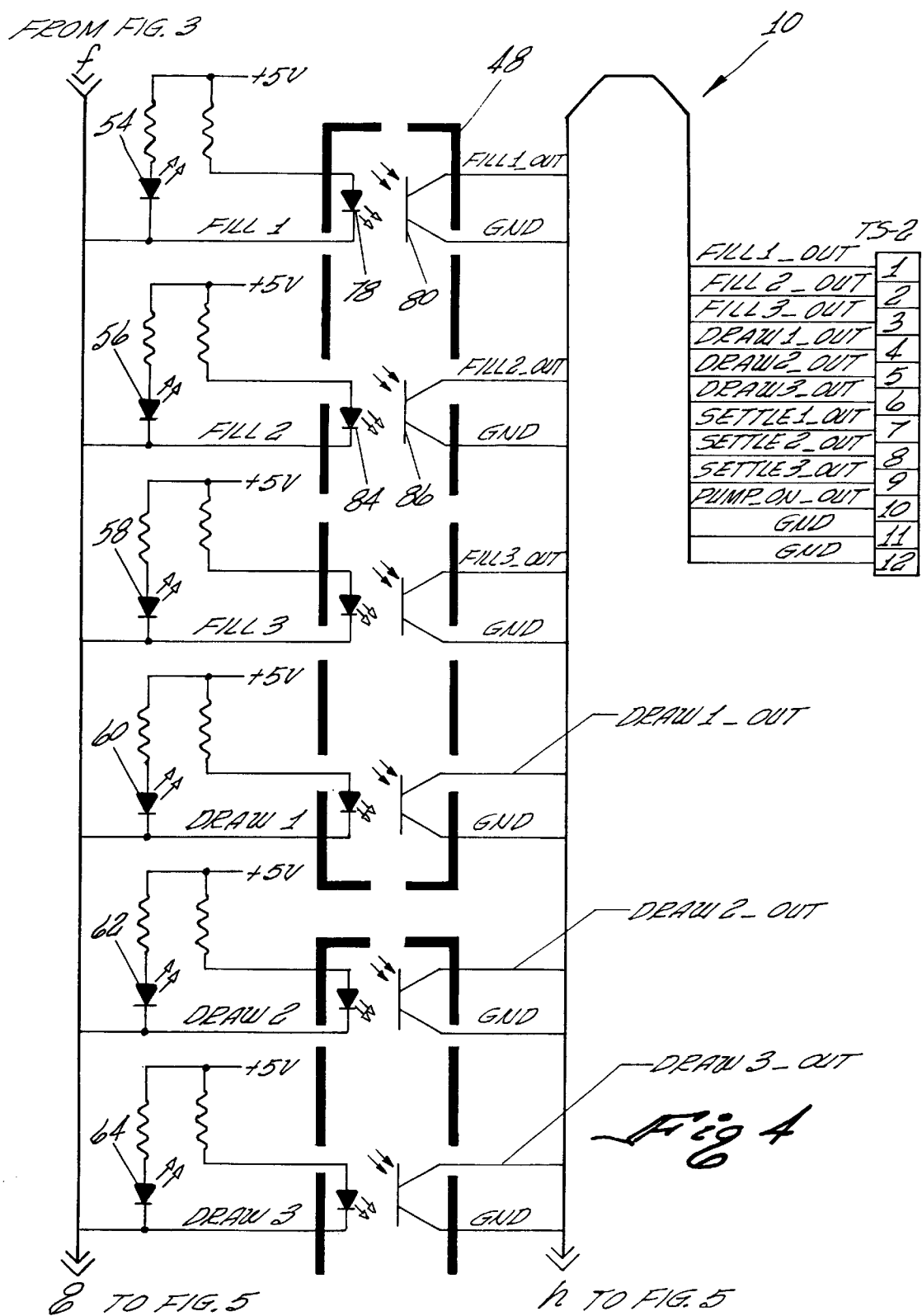
Figure 5:
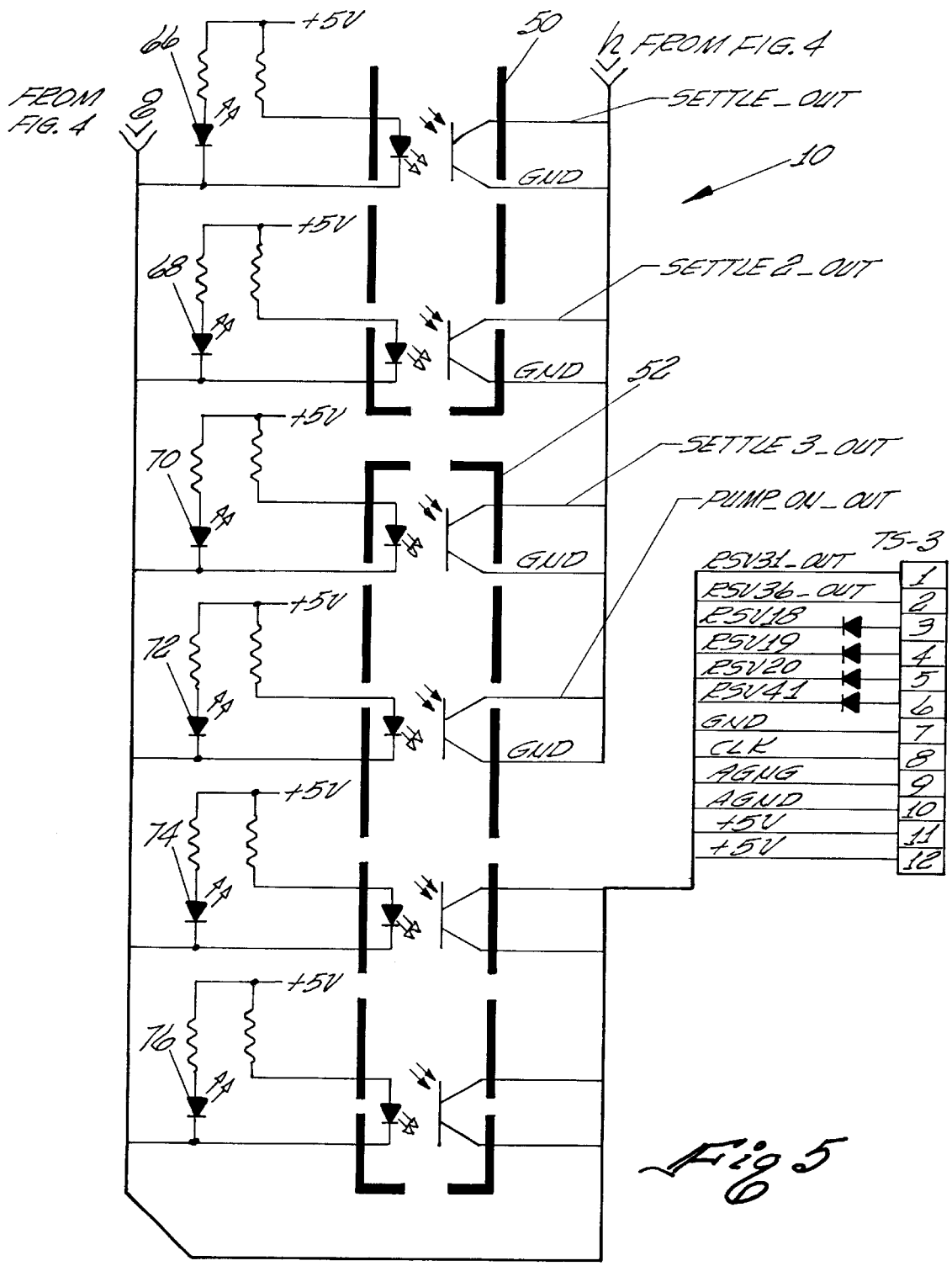

Referring to FIGS. 4 and 5, light emitting diodes 54, 56 and 58 when energized indicate to the user that tank one, tank two or tank three is being filled with contaminated water. Similarly, light emitting diodes 60, 62 and 64 when energized indicate to the user that water is being drawn from tank one, tank two or tank three. Light emitting diodes 66, 68 and 70 when energized indicate to the user that tank one, tank two and/or tank three is in a settling operation.

At this time it should be noted that the settling operation occurs (1) when a settling tank is not having water drawn from the tank; or (2) the settling tank is being filled with water.

The PUMP_ON light emitting diode 72 is energized when settling tank one, settling tank two or settling tank three is being filled. This indicates that the draw pump is drawing contaminated water from a stream, river or the like.

It should also be noted that electronic controller 10 includes a voltage regulator 90 which allows an external power supply to provide power to circuit 10. The external power supply can have a range from +8 VDC to +28 VDC.

Electronic controller 10 also has a clock source selection header 92 which allows the user to synchronous state machine 82 to the clock within bounce eliminator circuit 16. The user may also connect state machine 82 to an oscillator 94 by configuring header 92 so that the CLKB signal from oscillator 94 is supplied to programmable logic device 44.

The settle cycles for the three settling tanks are set forth in the following logic equations. For settling tank one the equations is as follows:

$$\text{Settle1} = !\text{fill1} \ \& \ !\text{LO1} \ \& \ !\text{draw1} \tag{1}$$

For settling tank two the equations is as follows:

$$\text{Settle2} = !\text{fill2} \ \& \ !\text{LO2} \ \& \ !\text{draw2} \tag{2}$$

For settling tank three the equations is as follows:

$$\text{Settle3} = !\text{fill3} \ \& \ !\text{LO3} \ \& \ !\text{draw3} \tag{3}$$

The PUMP_ON signal for the draw pump valve is set forth in the following equation:

$$\text{pump\_on} = \text{fill1} \ \# \ \text{fill2} \ \# \ \text{fill3} \tag{4}$$

where # is the symbol for "or".

From the foregoing, it may readily be seen that the present invention comprises a new, unique and exceedingly useful electronic controller for use in sequentially controlling the fill, settle and draw operations of a plurality of settling tanks used with a reverse osmosis unit which constitutes a considerable improvement over the known prior art. Many modifications and variations of the present invention are possible in light of the above teachings. It is to be understood that within the scope of the appended claims the invention may be practiced otherwise than as specifically described.

What is claimed is:

1. An electronic controller for controlling fill, draw and settle operations of a plurality of settling tanks coupled to a reverse osmosis system, said electronic controller comprising:

input terminal means for receiving a pair of liquid level input signals from each of said plurality of settling tanks which indicate a liquid level of a liquid within each of said plurality of settling tanks;

bounce eliminator circuit means connected to said input terminal means for eliminating oscillations from said pair of liquid level input signals;

processing means connected to said bounce eliminator circuit means to receive from said bounce eliminator circuit means said pair of liquid level signals for each of said plurality of settling tanks;

said processing means including state machine means having a plurality of operational states and a plurality of non-operational states, said state machine means processing said pair of liquid level signals from each of said plurality of settling tanks to generate a plurality of logic level control signals during the operational states of said state machine means;

coupling means connected to said processing means to receive said plurality of logic level control signals and then provide a plurality of isolated control signals which activate fill, draw and pump valves associated with said plurality of settling tanks; and output terminal means connected to said coupling means and said fill, draw and pump valves associated with said plurality of settling tanks, said output terminal means supplying said isolated control signals to said fill, draw and pump valves to selectively activate said fill, draw and pump valves associated with said plurality of settling tanks.

2. The electronic controller of claim 1 wherein said processing means comprises an erasable programmable read only memory.

3. An electronic controller for controlling fill, draw and settle operations of three settling tanks coupled to a reverse osmosis system, said electronic controller comprising:

an input terminal for receiving a pair of liquid level input signals from each of said three settling tanks which indicate a liquid level of a liquid within each of said three settling tanks;

a bounce eliminator circuit connected to said input terminal for eliminating oscillations from said pair of liquid level input signals;

a programmable logic device connected to said bounce eliminator circuit to receive from said bounce eliminator circuit said pair of liquid level signals for each of said three settling tanks;

said programmable logic device including a state machine having a plurality of operational states and at least two non-operational states, said state machine processing said pair of liquid level signals from each of said three settling tanks to generate a plurality of logic level control signals during the operational states of said state machine;

a plurality of photocouplers connected to said programmable array logic device to receive said plurality of logic level control signals and then provide a plurality of isolated control signals which activate fill, draw and pump valves associated with said three settling tanks; and an output terminal connected to said plurality of photocouplers and said fill, draw and pump valves associated with said three settling tanks, said output terminal supplying said isolated control signals to said fill, draw and pump valves to selectively activate said fill, draw and pump valves associated with said three settling tanks.

4. The electronic controller of claim 3 wherein said plurality of operational states of said state machine comprises eight operational states.

5. The electronic controller of claim 4 wherein said eight operation states include:

a wait fill one operational state wherein a fill one control signal is generated by said state machine to fill a first of said three settling tanks with said liquid;

a wait fill two operational state wherein a fill two control signal is generated by said state machine to fill a second of said three settling tanks with said liquid;

a draw one fill three operational state wherein a draw one control signal and a fill three control signal are generated by said state machine to draw said liquid from said first of said three settling tanks and to fill a third of said three settling tanks with said liquid;

a draw two fill three operational state wherein a draw two control signal and said fill three control signal are generated by said state machine to draw said liquid from said second of said three settling tanks and to fill said third of said three settling tanks with said liquid;

a draw two fill three operational state wherein said draw two control signal and said fill one control signal are generated by said state machine to draw said liquid from said second of said three settling tanks and to fill said first of said three settling tanks with said liquid;

a draw three fill one operational state wherein a draw three control signal and said fill one control signal are generated by said state machine to draw said liquid from said third of said three settling tanks and to fill said first of said three settling tanks with said liquid;

a draw three fill two operational state wherein said draw three control signal and said fill one control signal are generated by said state machine to draw said liquid from said third of said three settling tanks and to fill said second of said three settling tanks with said liquid; and a draw one fill two operational state wherein said draw one control signal and said fill two control signal are generated by said state machine to draw said liquid from said first of said three settling tanks and to fill said second of said three settling tanks with said liquid.

6. The electronic controller of claim 3 wherein said state machine generates a pump on control signal to activate said pump valve whenever any one of said fill one, fill two and fill three control signals is active.

7. The electronic controller of claim 3 further comprising a plurality of light emitting diodes connected to said bounce eliminator circuit, said plurality of light emitting diodes when energized indicating to a user of said electronic controller the liquid level of said liquid within each of said three settling tanks.

8. The electronic controller of claim 3 further comprising a plurality of light emitting diodes connected to said programmable logic controller, said plurality of light emitting diodes when energized indicating to a user of said electronic controller which of said logic level control signals are active during each of said plurality of operational states.

9. The electronic controller of claim 3 further comprising an oscillator connected to said programmable logic device.

10. The electronic controller of claim 3 further comprising a plurality of test switches connected to said bounce eliminator circuit, said test switches generating active low logic signals which simulate said pair of liquid level input signals from each of said three settling tanks allowing a user to test said electronic controller.

11. The electronic controller of claim 3 further comprising a voltage regulator which allows an external power supply having a voltage range of from +8 VDC to +28 VDC to provide power to said electronic controller.

12. The electronic controller of claim 3 further comprising a plurality of buffers connected to said bounce eliminator circuit and said programmable logic device.

13. The electronic controller of claim 3 wherein said state machine generates first, second and third settle signals which are active low when contaminants within said liquid are settling to the bottom of said first, second and third settling tanks.

14. An electronic controller for controlling fill, draw and settle operations of three settling tanks coupled to a reverse osmosis system, said electronic controller comprising:

an input terminal for receiving a pair of liquid level input signals from each of said three settling tanks which indicate a liquid level of a liquid within each of said three settling tanks;

a bounce eliminator circuit connected to said input terminal for eliminating oscillations from said pair of liquid level input signals;

a first plurality of light emitting diodes connected to said bounce eliminator circuit, said first plurality of light emitting diodes when energized indicating to a user of said electronic controller the liquid level of said liquid within each of said three settling tanks;

a programmable logic device connected to said bounce eliminator circuit to receive from said bounce eliminator circuit said pair of liquid level signals for each of said three settling tanks;

said programmable logic device including a state machine having eight operational states and at least two non-operational states, said state machine processing said pair of liquid level signals from each of said three settling tanks to generate a plurality of logic level control signals during the operational states of said state machine, said state machine generating at least one logic level control signal during each of the eight operational states of said state machine;

a plurality of photocouplers connected to said programmable array logic device to receive said plurality of logic level control signals and then provide a plurality of isolated control signals which activate fill, draw and pump valves associated with said three settling tanks;

a second plurality of light emitting diodes connected to said programmable logic controller, said second plurality of light emitting diodes when energized indicating to said user of said electronic controller which of said logic level control signals are active during each of said plurality of operational states; and an output terminal connected to said plurality of photocouplers and said fill, draw and pump valves associated with said three settling tanks, said output terminal supplying said isolated control signals to said fill, draw and pump valves to selectively activate said fill, draw and pump valves associated with said three settling tanks.

15. The electronic controller of claim 14 wherein said eight operation states include:

a wait fill one operational state wherein a fill one control signal is generated by said state machine to fill a first of said three settling tanks with said liquid;

a wait fill two operational state wherein a fill two control signal is generated by said state machine to fill a second of said three settling tanks with said liquid;

a draw one fill three operational state wherein a draw one control signal and a fill three control signal are generated by said state machine to draw said liquid from said first of said three settling tanks and to fill a third of said three settling tanks with said liquid;

a draw two fill three operational state wherein a draw two control signal and said fill three control signal are generated by said state machine to draw said liquid from said second of said three settling tanks and to fill said third of said three settling tanks with said liquid;

a draw two fill three operational state wherein said draw two control signal and said fill one control signal are generated by said state machine to draw said liquid from said second of said three settling tanks and to fill said first of said three settling tanks with said liquid;

a draw three fill one operational state wherein a draw three control signal and said fill one control signal are generated by said state machine to draw said liquid from said third of said three settling tanks and to fill said first of said three settling tanks with said liquid;

a draw three fill two operational state wherein said draw three control signal and said fill one control signal are generated by said state machine to draw said liquid from said third of said three settling tanks and to fill said second of said three settling tanks with said liquid; and a draw one fill two operational state wherein said draw one control signal and said fill two control signal are generated by said state machine to draw said liquid from said first of said three settling tanks and to fill said second of said three settling tanks with said liquid.

16. The electronic controller of claim 14 wherein said state machine generates a pump on control signal to activate said pump valve whenever any one of said fill one, fill two and fill three control signals is active.

17. The electronic controller of claim 14 further comprising an oscillator connected to said programmable logic device.

18. The electronic controller of claim 14 further comprising a plurality of test switches connected to said bounce eliminator circuit, said test switches generating active low logic signals which simulate said pair of liquid level input signals from each of said three settling tanks allowing a user to test said electronic controller.

19. The electronic controller of claim 14 further comprising a voltage regulator which allows an external power supply having a voltage range of from +8 VDC to +28 VDC to provide power to said electronic controller.

20. The electronic controller of claim 14 further comprising a plurality of buffers connected to said bounce eliminator circuit and said programmable logic device.

* * * * *